US011076281B1

(12) United States Patent
Yau et al.

(10) Patent No.: US 11,076,281 B1
(45) Date of Patent: Jul. 27, 2021

(54) 5G CORE ROAMING NETWORK FUNCTION PROXY IN AN IPX NETWORK

(71) Applicant: Syniverse Technologies, LLC, Tampa, FL (US)

(72) Inventors: Edward Yau, Tseung Kwan O (HK); Huiyue Xu, Tampa, FL (US); Prashant Datar, Tampa, FL (US); Ravi Tandon, Sandweiler (LU)

(73) Assignee: Syniverse Technologies, LLC, Tampa, FL (US)

( * ) Notice: Subject to any disclaimer, the term of this patent is extended or adjusted under 35 U.S.C. 154(b) by 0 days.

(21) Appl. No.: 17/164,275

(22) Filed: Feb. 1, 2021

Related U.S. Application Data

(60) Provisional application No. 62/968,685, filed on Jan. 31, 2020.

(51) Int. Cl.
*H04W 8/04* (2009.01)
*H04L 29/08* (2006.01)

(52) U.S. Cl.
CPC .............. *H04W 8/04* (2013.01); *H04L 67/16* (2013.01); *H04L 67/28* (2013.01)

(58) Field of Classification Search
CPC ........... H04W 8/04; H04W 8/06; H04W 8/12; H04W 8/18; H04W 92/24; H04L 67/16; H04L 67/28
See application file for complete search history.

(56) References Cited

U.S. PATENT DOCUMENTS

2019/0044932 A1* 2/2019 Kumar .................. H04W 12/12

OTHER PUBLICATIONS

Schneider, Peter, and Josef Urban. "Security in 5G Networks." Broadband Coverage in Germany; 14. ITG Symposium. VDE, 2020. (Year: 2020).*
3GPP TS23.501 "3rd Generation Partnership Project; Technical Specification Group Services and System Aspects; System Architecture for the 5G System; Stage 2" Jun. 2018.
3GPP TS23.502 "3rd Generation Partnership Project; Technical Specification Group Services and System Aspects; Procedures for the 5G System; Stage 2" Jun. 2018.
3GPP TS29.573 "3rd Generation Partnership Project; Technical Specification Group Core Network and Terminals; 5G System; Public Land Mobile Network (PLMN) Interconnection; Stage 3." Apr. 2019.
3GPP TS33.501 "3rd Generation Partnership Project; Technical Specification Group Services and System Aspects; Security architecture and procedures for 5G system," May 2019.

* cited by examiner

*Primary Examiner* — Sharad Rampuria
(74) *Attorney, Agent, or Firm* — Andriy Lytvyn; Smith & Hopen, P.A,

(57) ABSTRACT

This invention is a system and method for implementing Network Function (NF) Proxy in an IPX network for 5G core roaming. NF Discover queries from Visited Public Land Mobile Network (VPLMN) are manipulated such that the IPX NF Proxy's fully qualified domain name (FQDN) is returned as the FQDN of the Home Public Land Mobile Network (HPLMN) NF. NF Proxy queries the FQDN of a true HPLMN NF through a HPLMN Network Repository Function (NRF) Proxy. Application messages are routed to NF Proxy hosted in the IPX network. NF Proxy performs its proxy function and routes egress messages to the target NF in HPLMN or another location.

28 Claims, 16 Drawing Sheets

5G CORE ROAMING NETWORK FUNCTION PROXY IN AN IPX NETWORK

PRIORITY CLAIM

This non-provisional patent application claim priority to the U.S. Provisional Application No. 62/968,685 filed Jan. 31, 2020.

BACKGROUND OF THE INVENTION

1. Field of the Invention

This invention relates generally to the field of Internet Protocol (IP) and telecommunications networks, specifically to the 5G core roaming in Internetwork Packet Exchange (IPX). More specifically, the invention relates to methods and systems for implementing Network Function Proxy in IPX networks for 5G core roaming.

2. Brief Description of the Related Art

Mobile roaming refers to the scenario where a mobile subscriber of a Home Public Land Mobile Network (HPLMN) operator is using mobile service in a foreign location serviced by a Visited Public Land Mobile Network (VPLMN).

5G system architecture is specified in 3GPP TS23.501 "3rd Generation Partnership Project; Technical Specification Group Services and System Aspects; System Architecture for the 5G System; Stage 2" and TS23.502 "3rd Generation Partnership Project; Technical Specification Group Services and System Aspects; Procedures for the 5G System; Stage 2." 5G Signaling messages between roaming operators are specified in 3GPP TS29.573 "3rd Generation Partnership Project; Technical Specification Group Core Network and Terminals; 5G System; Public Land Mobile Network (PLMN) Interconnection; Stage 3." 5G security design is specified in 3GPP TS33.501 "3rd Generation Partnership Project; Technical Specification Group Services and System Aspects; Security architecture and procedures for 5G system," all of which are incorporated herein by reference.

To provide roaming services to a User Equipment (UE), Network Functions (NFs) in the Home Public Land Mobile Network (HPLMN) and the Visited Public Land Mobile Network (VPLMN) operators need to communicate with each other through an Internet Protocol Exchange (IPX) network. Such communication is required to enable HPLMN subscribers to use 5G service in VPLMN. As depicted in FIGS. 1-5, Network functions of the HPLMN and VPLMN communicate with one another for multiple purposes, including authentication, authorization, accounting, registration, session management, policing, user payload transmissions, etc. Examples of such network functions are Network Repository Function (NRF), Authentication Server Function (AUSF), Unified Data Management (UDM), Access and Mobility Management Function (AMF), Session Management Function (SMF), Policy Control Function (PCF), Network Slice Selection Function (NSSF) and User Plane Function (UPF).

Referring to FIGS. 4 and 5, in 5G core roaming, as specified in 3GPP TS29.573, all signaling messages between network functions in VPLMN and HPLMN are carried over N32 interface between the Security Edge Protection Proxy (SEPP) in VPLMN and HPLMN. SEPP acts as a 'application-firewall' to provide the necessary security for communicating with roaming partners, such as topology hiding, message authenticity, integrity and confidentiality checking, encryption of information elements, etc. FIG. 4 depicts the Home Routed (HR) roaming architecture, while FIG. 4 depicts a Local Breakout (LBO) roaming architecture. The HR and LBO roaming architectures differ in handling of user payload. In HR architecture, user payload is routed to HPLMN to reach the internet, while in LBO architecture user payload directly breaks-out at VPLMN to the internet.

N32 interface between SEPPs consists of two parts (1) N32-c for control plane and (2) N32-f for forward plane. The N32-c control plane is used for the following functions: (1) security capabilities negotiation, (2) parameters exchange, (3) n32-f termination, and (4) n32-f error reporting. The N32-f plane carries the actual application messages between network functions. The present invention relates to N32-f messages.

All request and response messages in the N32-f interface are protected with either Transport Layer Security (TLS) or Application Layer Security (ALS). TLS provides an end-to-end security between the two SEPPs, such that IPX has no visibility with respect to the content of the messages. ALS provides application layer integrity, authenticity and confidentiality protection between the two SEPPs. IPX may examine and modify the message contents by deploying a HTTP/2 Proxy which proxies the N32-f HTTP/2 message between SEPPs. The HTTP/2 Proxy may add 'patch requests' at the end of an application message. Patch requests contains the details of each change operation and a signature for authentication and integrity verification. The original message content from SEPP is not changed.

Traditional 3G and 4G network function proxies are implemented by routing the incoming requests from roaming partner network function to the proxy at SS7 Signal Point Code (STP) in 2G/3G, or Diameter Routing Agent (DRA) in 4G roaming. Because of the TLS and ALS protection in N32, HTTP/2 Proxy at IPX cannot simply route a message to network function proxy because this would violate the end-to-end security protection design of N32-f (authenticity and integrity check will fail).

Accordingly, what is needed is a method for implementing network function proxy in IPX for 5G core roaming, while complying to the 5G security requirements. This need exists for both home-routed HR roaming architecture, depicted in FIG. 4, and local breakout LBO roaming architecture, depicted in FIG. 5.

SUMMARY OF THE INVENTION

This invention pertains to methods and systems for implementing network function proxy in IPX for 5G core roaming, while complying to the 5G security requirements. This invention pertains to ALS being used in the N32-f interface between HPLMN SEPP (H-SEPP) and VPLMN SEPP (V-SEPP). This invention applies to both home-routed (HR) roaming architecture, depicted in FIG. 4, and local breakout (LBO) roaming architecture, depicted in FIG. 5.

Embodiments of this invention can be applied to any 5G Network Functions including the following: Network Repository Function (NRF), Authentication Server Function (AUSF), Unified Data Management (UDM), Access and Mobility Management Function (AMF), Session Management Function (SMF), Policy Control Function (PCF), Network Slice Selection Function (NSSF) and User Plane Function (UPF).

According to an embodiment of the invention, messages between a NF of VPLMN and its corresponding NF of HPLMN are routed through the NF Proxy Platform hosted in the IPX, instead of being routed directly. Network Function Proxy Platform can be configured to process and manipulate the messages passing therethrough, performing message filtering, routing and mediation functions.

Embodiments of the present invention pertain to networking and applications system—referred to herein as NF Proxy Platform—that comprises of the following components: (1) HTTP/2 Proxy (H2Proxy), which proxies and mediates N32-f messages between VPLMN and HPLMN, (2) an IPX NF Proxy, and (3) IPX-SEPP that connects the IPX NF Proxy with the H2Proxy. All of these components can be deployed in the IPX network. Some embodiments of the invention further include an IPX NRF Proxy deployed in the IPX network which is configured to communicate with the IPX-Proxy and the HPLMN NRF (H-NRF).

In an embodiment, the method of providing a NF Proxy service involves the following steps: (1) manipulating the NF Discover response message towards VPLMN so that the VPLMN NF will send the application message to the IPX NF Proxy; and (2) upon receiving the application message, IPX NF Proxy performs its proxy function and routes the egress message to the target NF in HPLMN.

In an embodiment, IPX NF Proxy sits behind an IPX-SEPP so that N32-c and N32-f message integrity and authenticity are protected at the following two connections: (1) between V-SEPP and IPX-SEPP, and (2) between IPX-SEPP and H-SEPP. This architecture conforms with the security requirements of 5G N32 interface.

In an embodiment, upon receiving a NF Discover request from the VPLMN, the H-NRF replies with a Fully Qualified Domain Name (FQDN) of the IPX NF Proxy as the target NF's FQDN. When the application message from VPLMN NF reaches the NF Proxy, the NF Proxy sends another NF Discover request through its NRF Proxy to HPLMN. The home NRF replies with the true target NF's Fully Qualified Domain Name (FQDN) to IPX NF Proxy. The IPX NF Proxy performs its proxy function and routes the egress message to the target H-NF in HPLMN.

In another embodiment, the H2Proxy mediates the NF Discover response message from HPLMN, modifying the FQDN of the target H-NF with the FQDN of the IPX NF Proxy in the IPX network. Then, the H2Proxy sends the modified NF Discover response message to the VPLMN and sends the FQDN of the target H-NF to the IPX NF Proxy through an internal Application Programing Interface (API). When the application from VPLMN NF reaches the IPX NF Proxy, the IPX NF Proxy performs its proxy function and routes the request to the target H-NF in the HPLMN.

In another embodiment, the HPLMN advertises the IPX NRF Proxy's FQDN as its NRF FQDN in its GSMA IR.21 document (the document that a mobile operator exchanges its roaming network information with its roaming partners). The NF Discover request from VPLMN NRF is sent to the IPX NRF Proxy, as per IR.21 specifications. The IPX NRF Proxy then triggers a NF Discover to H-NRF to obtain the FQDN of the target H-NF. The FQDN of the target H-NF from the HPLMN's NF Discover response is sent to the IPX NF Proxy, which will be used for egress routing of application message. In addition, the IPX NRF Proxy returns a NF Discover response that carries the FQDN of the IPX NF Proxy to the VPLMN. When the application message from the V-NF reaches the IPX NF Proxy, the IPX NF Proxy performs its proxy function and routes the request to the target H-NF in the HPLMN.

BRIEF DESCRIPTION OF THE DRAWINGS

For a fuller understanding of the invention, reference should be made to the following detailed disclosure, taken in connection with the accompanying drawings, in which.

DETAILED DESCRIPTION OF THE PREFERRED EMBODIMENT

In the following detailed description of the preferred embodiment, reference is made to the accompanying drawings, which form a part hereof, and within which specific embodiments are shown by way of illustration by which the invention may be practiced. It is to be understood that other embodiments may be utilized and changes may be made without departing from the scope of the invention.

FIGS. 6-11 depict three exemplary embodiments of the invention. Specifically, FIGS. 6 and 7 pertain to an embodiment implementing a 'Home NRF Routing' approach, FIGS. 8 and 9 pertain to 'HTTP/2 Proxy Routing' approach, and FIGS. 10 and 11 pertain to 'NRF Proxy' approach. Each of these exemplary embodiments is described in more detail below.

Home NRF Routing Approach

Figure 1:
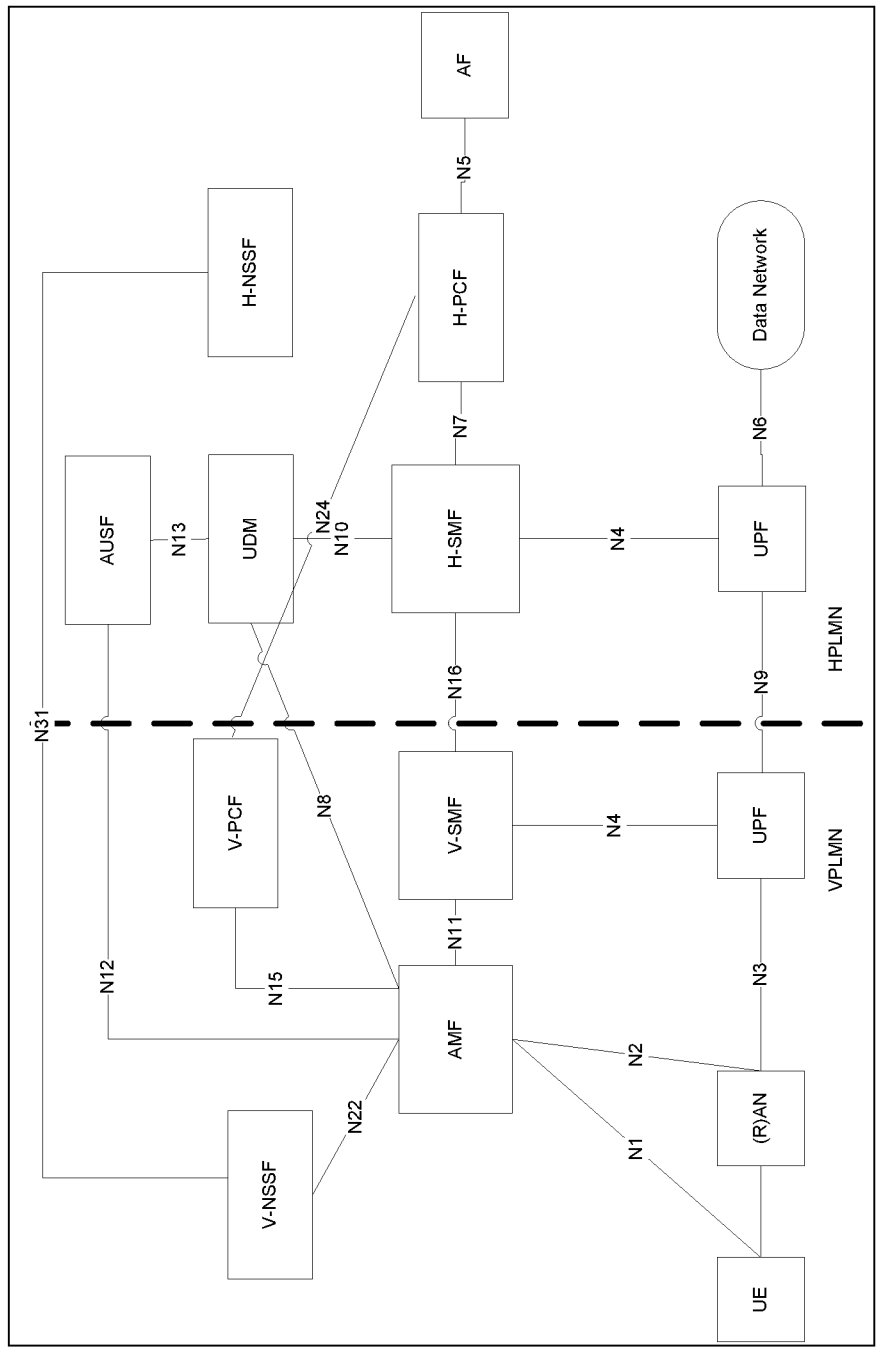
FIG. 1 is a block diagram schematically depicting the 5G roaming architecture in a home-routed scenario in reference point representation. Reference point for network interface between network functions are shown.
Figure 2:
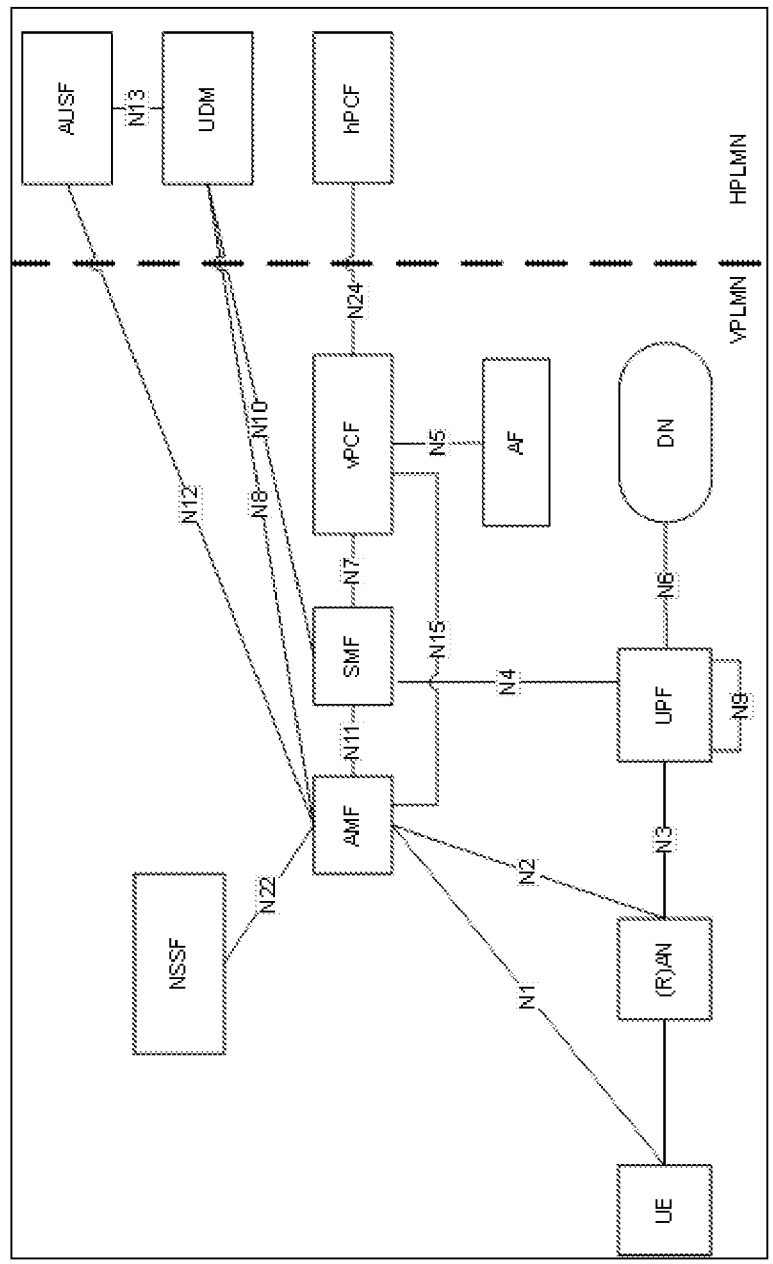
FIG. 2 is a block diagram schematically depicting the 5G roaming architecture in a local-breakout scenario in reference point representation. Reference point for network interface between network functions are shown.
Figure 3:
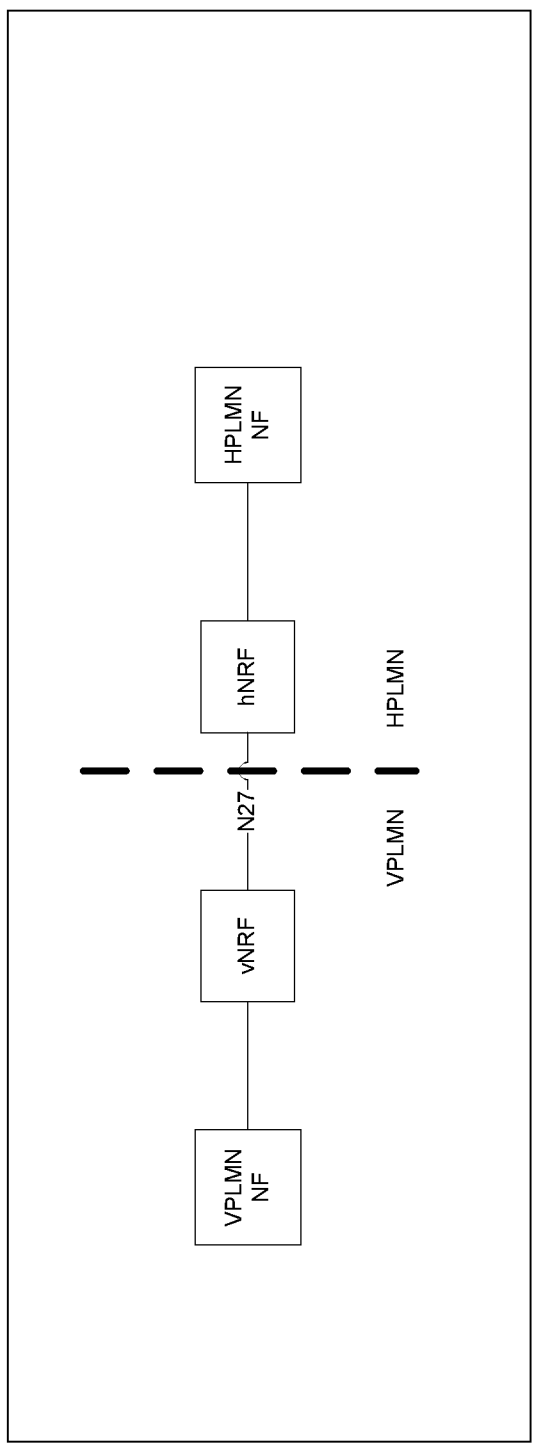
FIG. 3 is a block diagram schematically depicting the 5G roaming architecture in which a vNRF in VPLMN exchanges messages with NRF in HPLMN via N27 interface. It should be noted that N27 messages are also carried through the N32-f interface between SEPPs.
Figure 4:
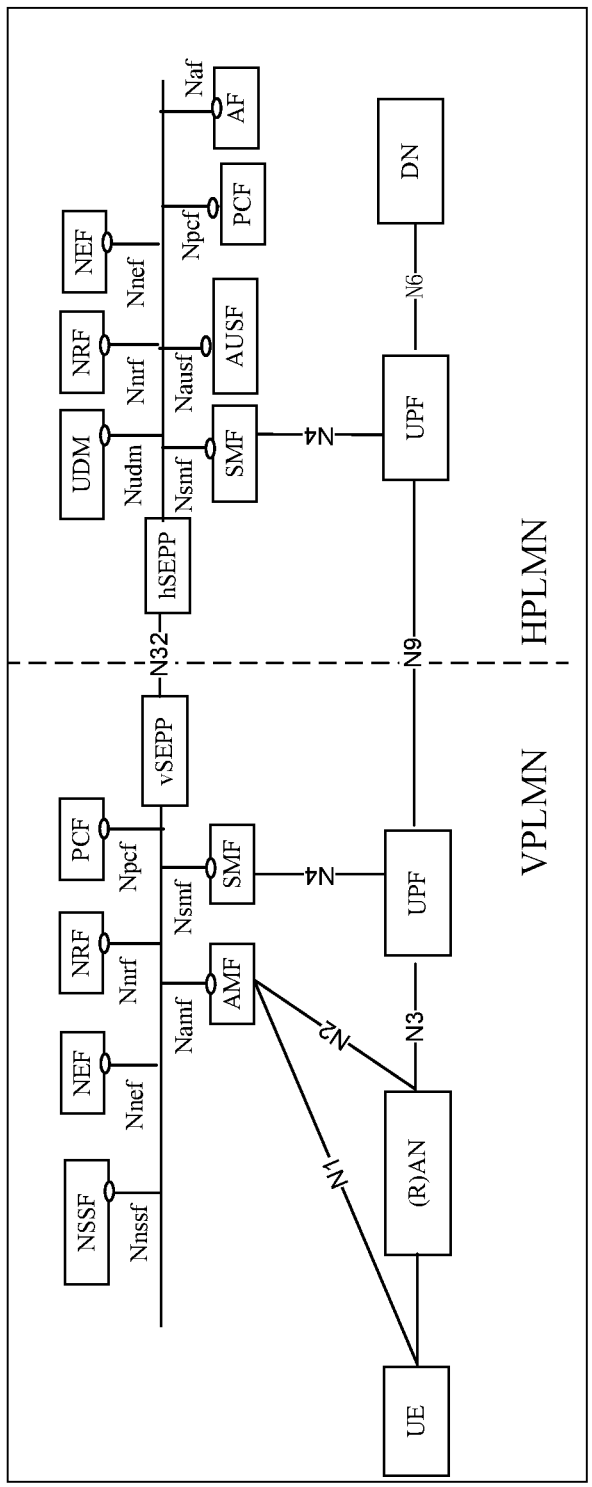
FIG. 4 is a block diagram schematically depicting the 5G roaming architecture in a home-routed scenario in service-based representation. Supported service names at network functions are shown.
Figure 5:
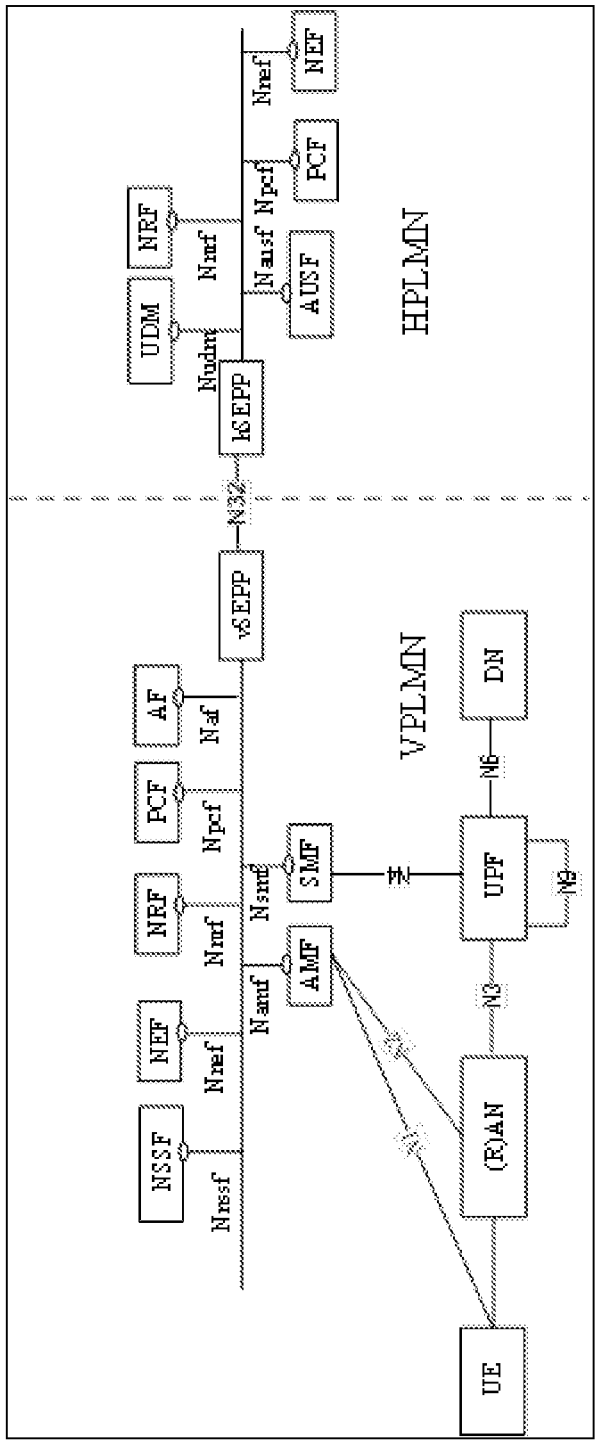
FIG. 5 is a block diagram schematically depicting the 5G roaming architecture in a local-breakout scenario in service-based representation. Supported service names at network functions are shown.
Figure 6:
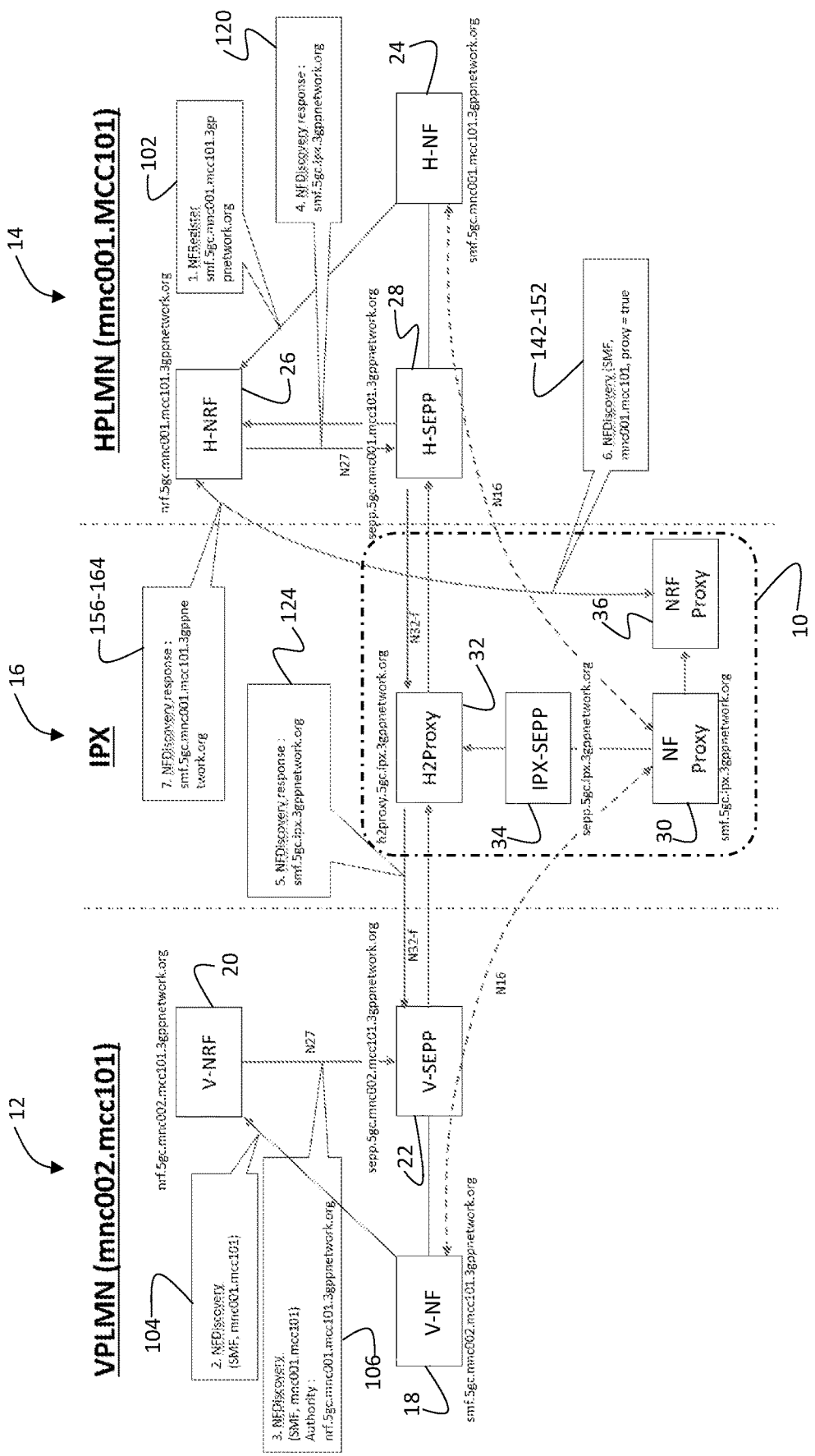
FIG. 6 is a block diagram schematically depicting the system architecture and message flow of NF Proxy Platform in one embodiment using 'Home NRF Routing' approach.
Figure 7:
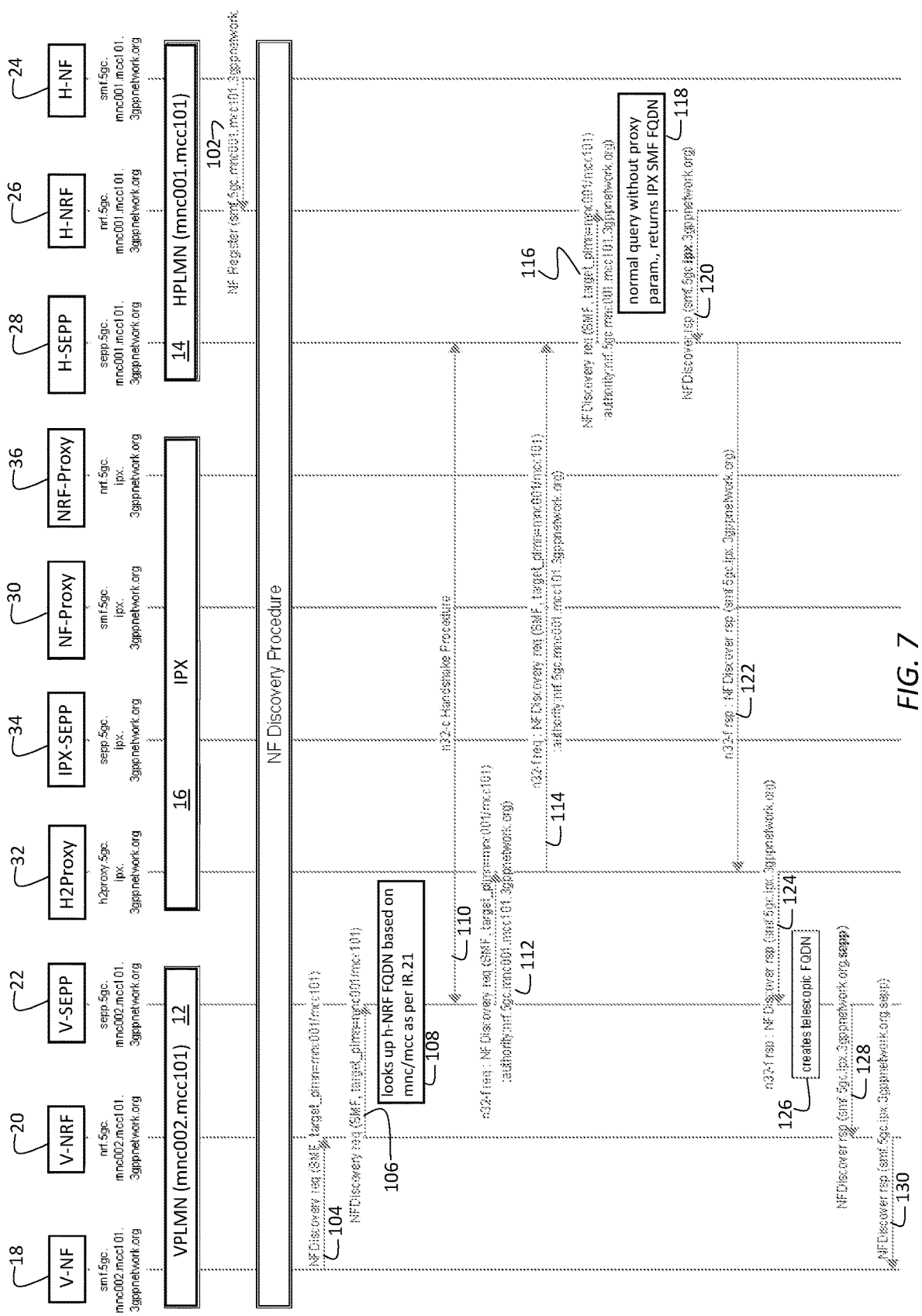
FIG. 7 is a sequence diagram schematically depicting the callflow of NF Proxy implementation using 'Home NRF Routing' approach.
Figure 7:
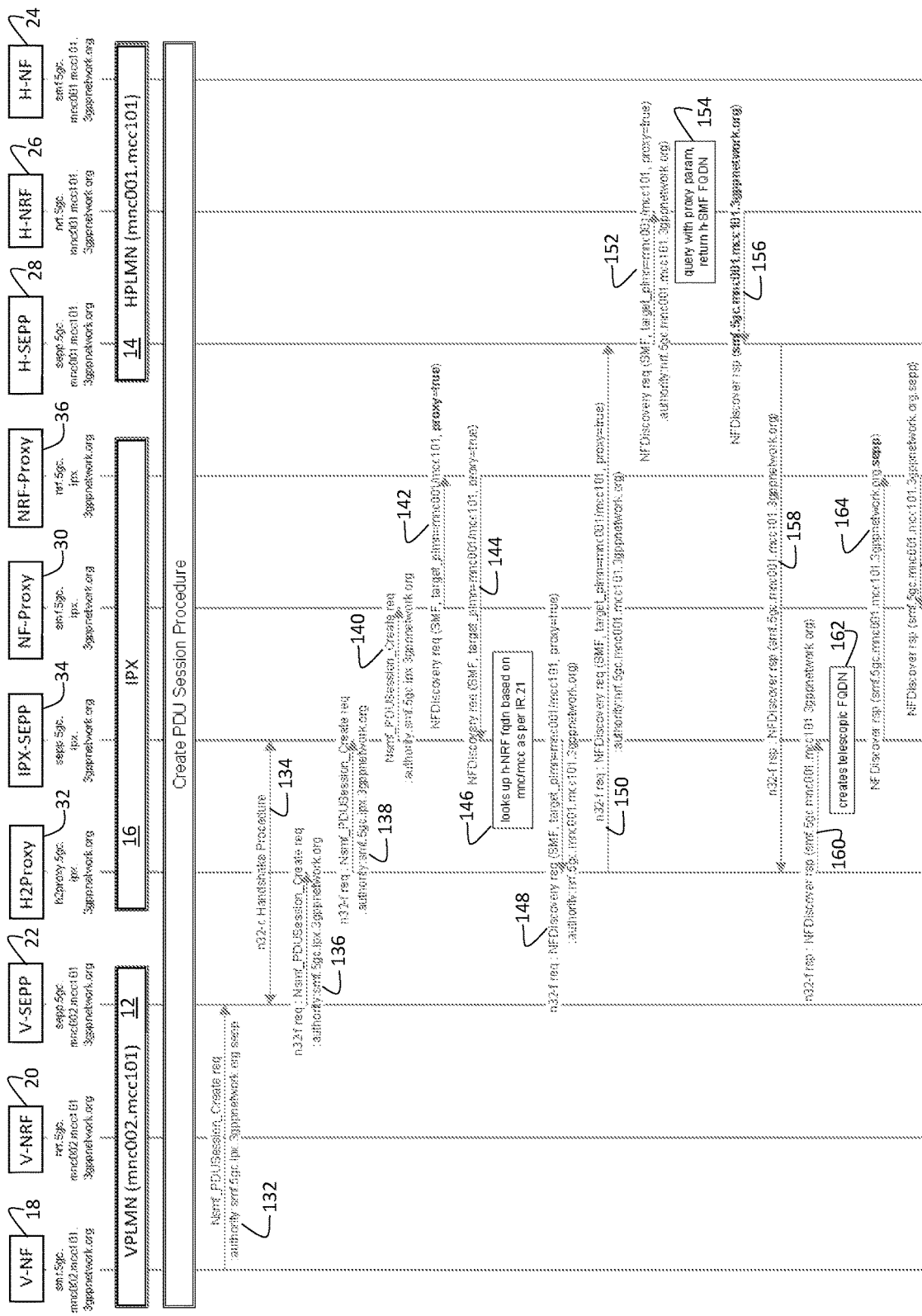
Figure 7:
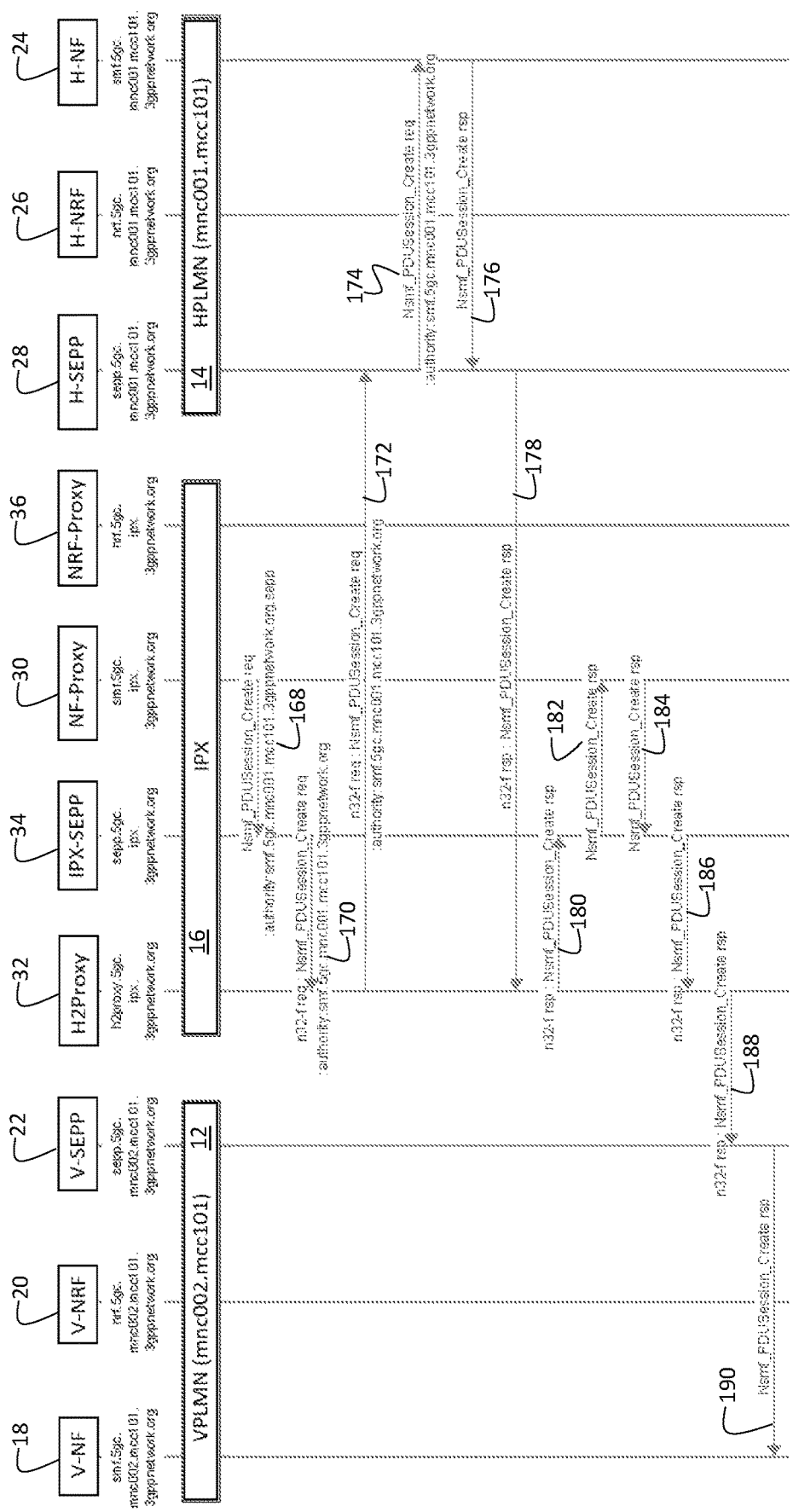

The embodiment depicted in FIGS. 6 and 7 pertains to 'Home NRF Routing' approach. FIG. 6 schematically depicts architecture of this embodiment. FIG. 6 depicts Visited Public Land Mobile Network (VPLMN) 12 and Home Public Land Mobile Network (HPLMN) 14. Both VPLMN 12 and HPLMN 14 are 5G networks. FIG. 6 depicts that VPLMN 12 and HPLMN 14 and interconnected via an Internet Protocol Exchange (IPX) network 16.

To provide 5G roaming services to a User Equipment (UE) roaming in VPLMN 12 and subscribed to HPLMN 14, Network Functions (NFs) of VPLMN 12 and HPLMN 14 must be able to communicate with one another. This means that messages must be routed between NFs of VPLMN 12 and HPLMN 14 through IPX network 16, without violating the end-to-end security protection design of N32-f. To achieve this objective, the present invention introduces a NF Proxy Platform 10 is deployed in IPX network 16.

FIG. 6 depicts that VPLMN 12 comprises a VPLMN NF (V-NF) 18. In the example depicted in FIGS. 6 and 7, V-NF 18 is a Session Management Function (SMF). SMF is used merely as an example, and the method and system disclosed herein can be applied to other NFs, including the following: Network Repository Function (NRF), Authentication Server Function (AUSF), Unified Data Management (UDM), Access and Mobility Management Function (AMF), Policy Control Function (PCF), Network Slice Selection Function (NSSF) and User Plane Function (UPF).

FIG. 6 further depicts that V-NF 18 is in communication with VPLMN NRF (V-NRF) 20 and VPLMN Security Edge Protection Proxy (V-SEPP) 22. Analogously, HPLMN 14 comprises H-NF 24, which, in this example, is H-SMF. HPLMN 14 further comprises H-NRF 26 and H-SEPP 28 in communication with H-NF 24.

FIG. 6 further shows that NF Proxy Platform 10 comprises an IPX NF Proxy 30, in this example SMF Proxy. IPX NF Proxy 30 is configured to perform the proxy function between V-NF 18 and H-NF 24. NF Proxy Platform 10 further comprises Hypertext Transport Protocol/2 Proxy (H2Proxy) 32, IPX-SEPP 34, and IPX NRF Proxy 36. HTTP/2 Proxy 32 communicates with V-SEPP 22 and H-SEPP 28 to proxy and mediate N32-f messages between VPLMN 12 and HPLMN 14. IPX-SEPP 34 is deployed between H2Proxy 32 and IPX NF Proxy 30 to convert NF application messages to/from N32-f format. IPX NF Proxy 30 is also configured to communicate IPX NRF Proxy 36, which is configured to proxy NF Discover messages towards H-NRF 26.

For a message from V-NF 18 to reach H-NF 24, V-NF 18 needs to send the message to IPX NF Proxy 30, which then proxies the message and sends the egress message toward H-NF 24. To enable this communication link, NF Proxy Platform 10 must provide VPLMN 12 with a fully qualified domain name (FQDN) of IPX NF Proxy 30 (in this example, smf.5gc.ipx.3gppnetwork.org). Furthermore, IPX NF Proxy 30 must obtain a FQDN of H-NF 24 (in this example, smf.5gc.mnc001.mcc101.3gppnetwork.org).

In the embodiment of FIGS. 6 and 7, routing of messages from V-NF 18 to H-NF 24 via IPX NF Proxy is achieved using a special logic at home H-NRF 26. According to this special logic, H-NRF 26 is configured to reply to NF Discover requests from VPLMN 12 with a FQDN of IPX NF Proxy 30. However, for NF Discover requests from the NF Proxy Platform 10, H-NRF 26 is configured to reply with a FQDN of true H-NF 24. To enable H-NRF 26 to distinguish between NF Discover requests from VPLMN 12 and NF Proxy Platform 10, this embodiment of the invention uses a special parameter in the NF Discover request message.

When an active H-NF 24 starts up in HPLMN 14, the active H-NF 24 registers its FQDN at H-NRF 26 in step 102. Subsequently, in step 104, V-NF 18 queries the FQDN of H-NF 24 to which V-NF 18 intends to connect by sending a first NF Discover query towards V-NRF 20. In step 106, V-NRF 20 proxies the request through V-SEPP 22, IPX H2Proxy 32, and H-SEPP 28 to reach H-NRF 26. Next, H-NRF 26 determines that the received NF Discover request lacks a predefined special parameter, which means that the NF Discover request originated from VPLMN 12. Then, in step 120 (intermediate steps are only depicted in FIG. 7), H-NRF 26 responds to the NF Discover request with the FQDN of IPX NF Proxy 30.

Subsequently, NF Proxy Platform 10 executes a second NF Discover query with a special parameter toward H-NRF 26. Based on the presence of the special parameter in this second NF Discover request, H-NRF 26 determines that this query originated from IPX NF Proxy Platform 10. In step 156, H-NRF 26 responds to the second NF Discover request with the FQDN of H-NF 24 (which is the true target destination of the messages from V-NF 18). After IPX NF Proxy 30 receives the FQDN of H-NF 24, IPX NF Proxy 30 is able to perform its proxy function and to route the egress messages to the H-NF 24 (the target NF). In this manner, NF Proxy Platform 10 enables V-NF 18 and H-NF 24 to communicate with one another via IPX NF Proxy 30 within IPX network 16.

FIG. 7 is a signaling flow diagram depicting in more detail the method according to which NF Proxy Platform 10 enables communication of messages between V-NF 18 and H-NF 24 via IPX network 16. In step 102, H-NF 24 registers its FQDN with H-NRF 26. Subsequently, in step 104, V-SMF 18 sends to V-NRF 20 a first NF Discover request for FQDN of H-NF 24. In step 106, V-NRF 20 sends this NF Discover request to V-SEPP 22. In step 108, V-SEPP 22 looks up the FQDN of H-NRF 26, which HPLMN 14 provides in a Global System for Mobile Communications Association (GSMA) IR.21 document.

After obtaining the FQDN of H-NRF 26, V-SEPP 22 performs N32-c handshake procedure with H-SEPP 28 in step 110. In step 112, V-SEPP 22 sends the first NF Discover request to H2Proxy 32. In step 114, H2Proxy 32 sends the first NF Discover request to H-SEPP 28. In step 116, H-SEPP 28 sends the first NF Discover request to H-NRF 26. In step 118, H-NRF 26 determines that the first NF Discover request lacks a special proxy parameter, which means that the first NF Discover request originated from VPLMN 12. Based on this determination, H-NRF 26 is configured to respond to the first NF Discover request with the FQDN of IPX NF Proxy 30.

In step 120, H-NRF 26 sends the NF Discover response to the first NF Discover request to H-SEPP 28. In step 122, H-SEPP 28 sends this NF Discover response H2Proxy 32. In step 124, H2Proxy 32 sends the NF Discover response to V-SEPP 22. As explained earlier, the NF Discover response contains the FQDN of IPX NF Proxy 32. In step 126, V-SEPP 22 creates a telescopic FQDN comprising the FQDN of the IPX NF Proxy 30. In step 128, V-SEPP 22 sends the NF Discover response with the telescopic FQDN to V-NRF 20. In step 130, V-NRF 20 sends the NF Discover response to V-NF 18.

Next, in step 132, V-NF 18 sends a PDU Session Create request to V-SEPP 22. In step 134, V-SEPP 22 performs N32-c handshake procedure with IPX-SEPP 34. Then, in step 136, V-SEPP 22 sends the PDU Session Create request to H2Proxy 32. In step 138, H2Proxy 32 sends the PDU Session Create request to IPX-SEPP 34. IPX-SEPP 34 converts the PDU Session Create request from N32-f format and, in step 140, sends the PDU Session Create request to IPX NF Proxy 30.

In step 142, IPX NF Proxy 30 sends a second NF Discover request to IPX NRF Proxy 36. In step 144, IPX NRF Proxy 36 sends this NF Discover request to IPX-SEPP 34, Next, in step 146, IPX-SEPP 34 looks up the FQDN of H-NRF 26 in GSMA IR.21 document. In step 148, IPX-SEPP 34 coverts the NF Discover request to N32-f format and sends it to H2Proxy 32. In step 150, H2Proxy 32 sends the N32-f NF Discover request to H-SEPP 28. In step 152, H-SEPP 28 sends the NF Discover to H-NRF 26. Because this NF Discover request has the special parameter indicating that it originated from the IPX NF Proxy Platform 10, H-NRF 26 is configured to resolve the second NF Discover request to the FQDN of H-NF 24 in step 154. Then, in step 156, H-NRF 26 sends to H-SEPP 28 a NF Discover response having the FQDN of H-NF 24.

In step 158, H-SEPP 28 sends the NF Discover response to H2Proxy 32. In step 160, H2Proxy 32 sends the NF Discover response to IPX-SEPP 34. In step 162, IPX-SEPP 34 creates a telescopic FQDN comprising the FQDN of H-NF 24. In step 164, IPX-SEPP 34 sends the NF Discover response to IPX NRF Proxy 36. In step 166, IPX NRF Proxy 30 sends the NF Discover response to IPX NF Proxy 30. Because this NF Discover request contains the FQDN of the H-NF 24, IPX NF Proxy 30 is now able to send egress messages to H-NF 24.

Next, in step 168, IPX NF Proxy 30 sends a PDU Session Create request to IPX-SEPP 34. IPX-SEPP 34 receives the PDU Session Create request, converts it to N32-f format and, in step 170, sends it to H2Proxy 32. In step 172, H2Proxy 32 sends the N-32-f PDU Session Create request to H-SEPP 28, which converts it from the N32-f format and, in step 174, sends it to the H-NF 24, which is the target destination.

In step 176, H-NF 24 responds with the PDU Session Create response and sends it to H-SEPP 28. In step 178, H-SEPP 28 sends the N32-f PDU Session Create response to H2Proxy 32, which, in step 180, sends this message to IPX-SEPP 34. IPX-SEPP 34 converts the message from N32-f and, in step 182, sends the PDU Session Create response to IPX NF Proxy 30. In step 184, the IPX NF Proxy 30 performs its proxy function and sends the PDU Session Create response toward VPLMN 12. In step 184, IPX-SEPP 34 receives the PDU Session Create response from IPX NF Proxy 30. IPX-SEPP 34 converts the received message to N32-f format and, in step 186 sends this message to H2Proxy 32. In step 188, H2Proxy 32 sends this N32-f PDU Session Create response to V-SEPP 22. Finally, in step 190, V-SEPP 22 sends the PDU Session Create response to V-NF 18. Subsequent messages between V-NF 18 and H-NF 24 are sent via IPX NF Proxy 30 following the same path. In this manner, IPX NF Proxy Platform 10 enables 5G roaming services between VPLMN 12 and HPLMN 14.

HTTP/2 Proxy Routing Approach

Figure 8:
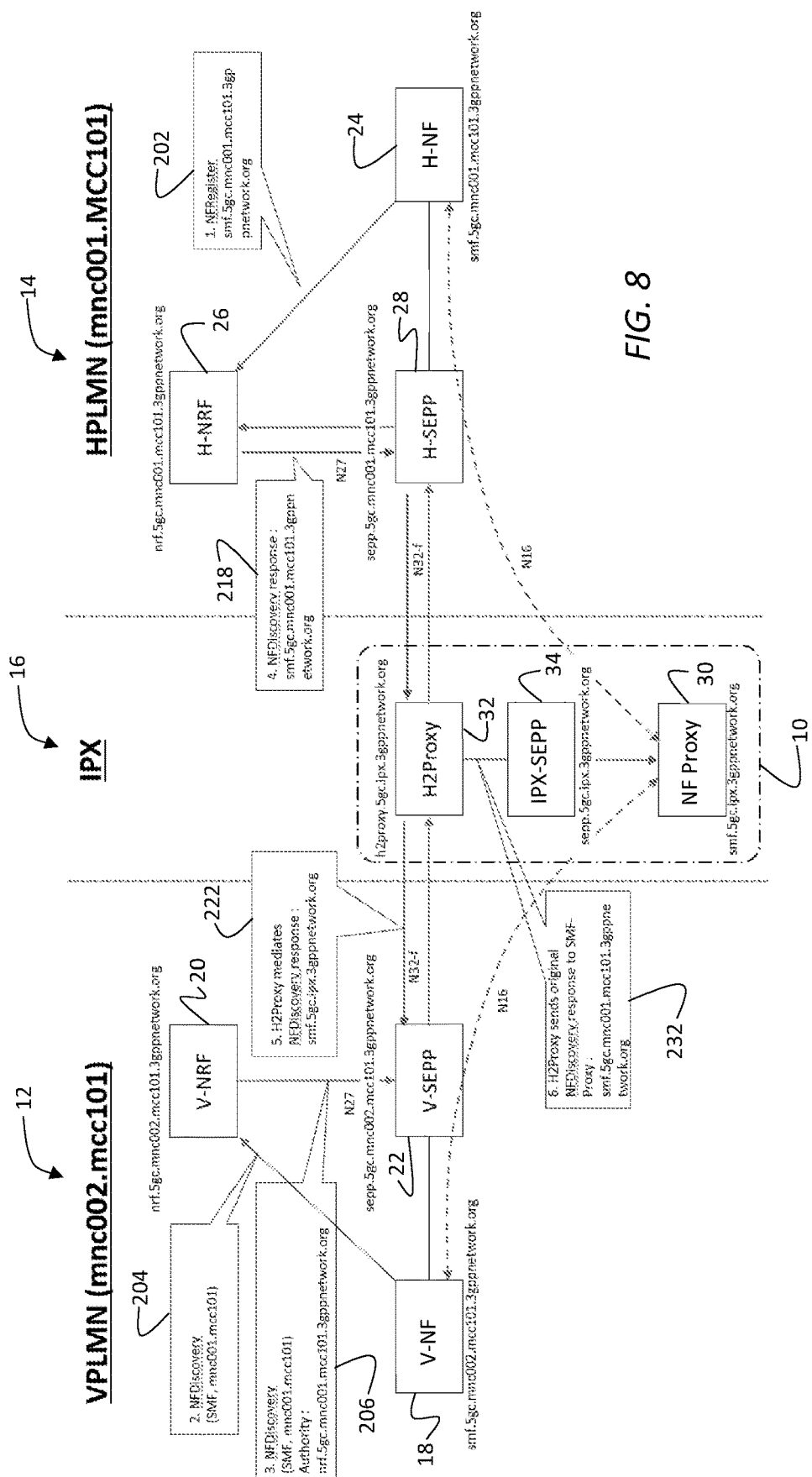
FIG. 8 is a block diagram schematically depicting the system architecture and message flow of NF Proxy Platform in another embodiment using 'HTTP/2 Proxy Routing' approach.
Figure 9:
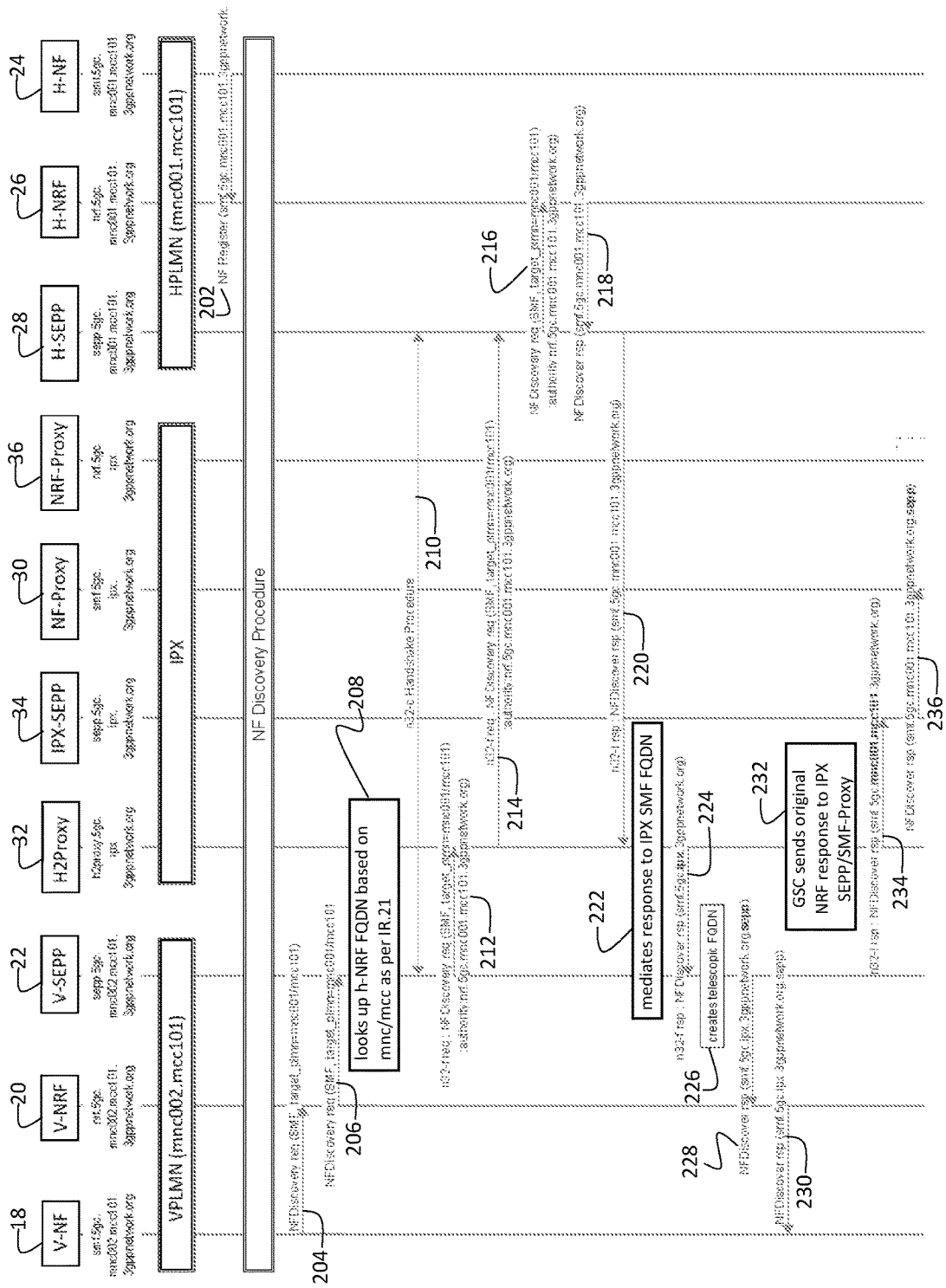
FIG. 9 is a sequence diagram schematically depicting the callflow of NF Proxy implementation using 'HTTP/2 Proxy Routing' approach.
Figure 9:
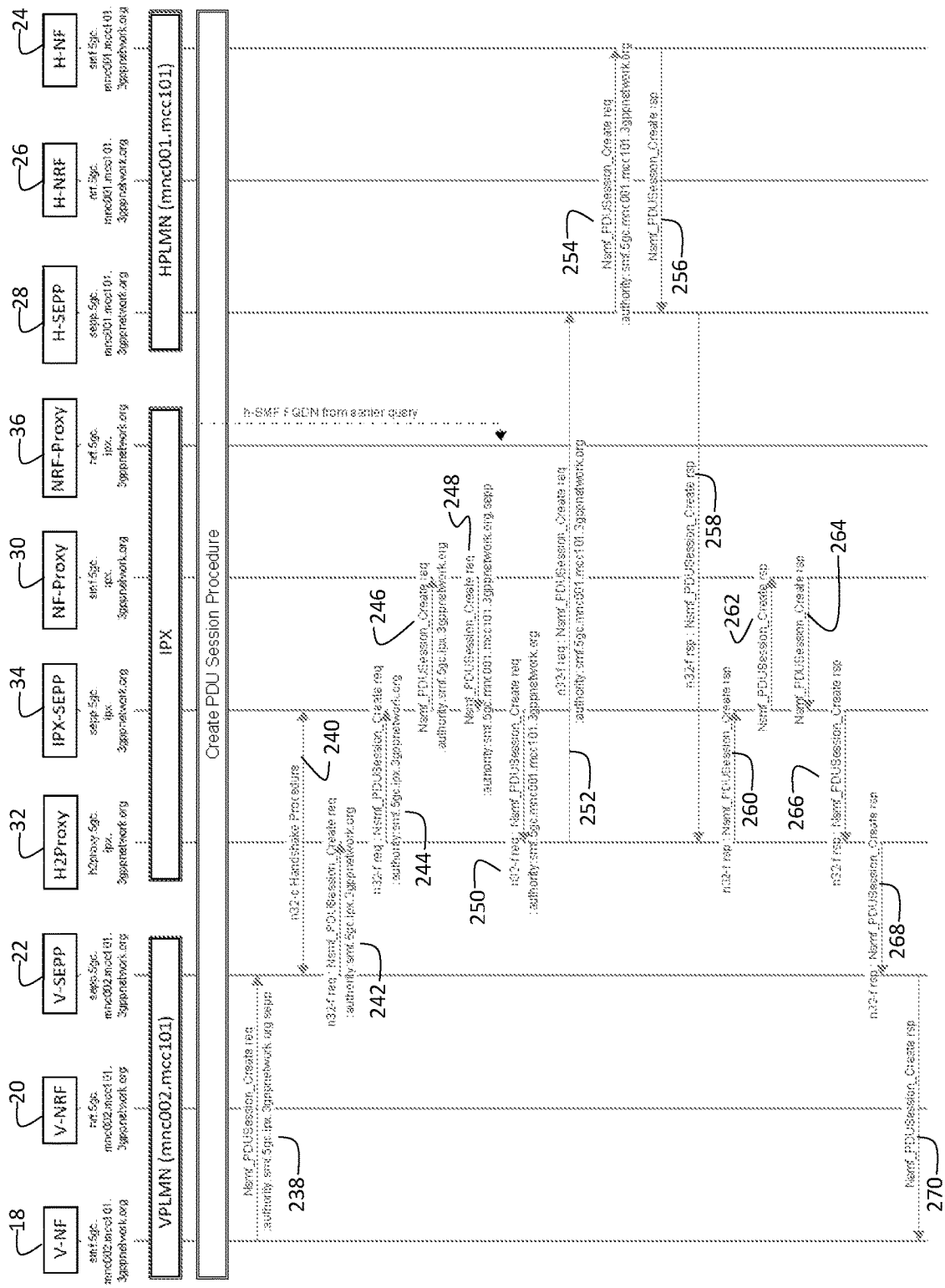

The embodiment depicted in FIGS. 8 and 9 uses 'HTTP/2 Proxy Routing' approach. In this embodiment, the routing to IPX NF Proxy 30 is achieved by implementing a special logic at IPX H2Proxy 32 to replace the target H-NF 24 FQDN information element (IE) in NF Discover response with the FQDN of IPX NF Proxy 30.

In this embodiment, in contrast to the embodiment depicted in FIGS. 6 and 7, H-NRF 26 does not need to be configured to distinguish between NF Discover requests originating from VPLMN 12 and IPX NF Proxy Platform 10. Instead, H-NRF 26 simply returns the FQDN of H-NF 24 in response to any pertinent NF Discover request. Then, H2Proxy 32 replaces the FQDN of H-NF 24 with the FQDN of IPX NF Proxy 30 and sends the FQDN of IPX NF Proxy 30 in response to NF Discover request from VPLMN 12.

FIG. 8 depicts that, when an active H-NF 24 starts up in HPLMN 14, the active H-NF 24 registers its FQDN at H-NRF 26 in step 202. Subsequently, V-NF 18 queries H-NRF 26 for the FQDN of the H-NF 24 to which the V-NF 18 intends to connect. To achieve this, V-NF 18 sends a NF Discover query towards V-NRF 20 in step 204. Next, in step 206, V-NRF 20 proxies this request through V-SEPP 22, IPX HTTP/2 Proxy 32, and H-SEPP 28 to reach H-NRF 26. In step 218 (intermediate steps are omitted in FIG. 8 and are only depicted in FIG. 9), H-NRF 26 replies with the FQDN of H-NF 24 (which is the true destination for the message). Next, when the NF Discover response reaches H2Proxy 32, H2Proxy 32 mediates the message in step 222 by replacing the FQDN of H-NF 24 with the FQDN of the IPX NF Proxy 30. Replacing the FQDN is achieved by adding a 'patch request' to the N32-f message requesting V-SEPP 22 to perform the necessary 'modify' operation with respect to the information element. Next, upon receipt of the NF Discover response, V-SEPP 22 applies this 'patch request' operation and returns the FQDN of IPX NF Proxy 30 to V-NRF 30, and subsequently V-NF 18. In addition, in step 232, H2Proxy 30 sends the FQDN of H-NF 24 (which is the target NF) to IPX NF Proxy 30 through an internal Application Programming Interface (API). In this manner, H2Proxy 32 provides the FQDN of IPX NF Proxy 30 to VPLMN 12 and provides the FQDN of H-NF 24 to IPX NF Proxy 30.

Subsequently, when V-NF 18 sends an application message, the application message reaches IPX NF Proxy 30. As explained above, IPX NF Proxy 30 has already obtained the FQDN of the H-NF 24 (target NF) from the internal API from H2Proxy 30. Thus, IPX NF Proxy 30 is able to perform its proxy function and route the egress messages to H-NF 24 (target NF) in HPLMN 14.

FIG. 9 depicts the steps of this method in more detail. In step 202, H-NF 24 registers its FQDN with H-NRF 26. Subsequently, in step 204, V-SMF 18 sends to V-NRF 20 a NF Discover request querying for FQDN of H-NF 24. In step 206, V-NRF 20 sends this NF Discover request to V-SEPP 22. In step 208, V-SEPP 22 looks up the FQDN of H-NRF 26, which HPLMN 14 provides in a GSMA IR.21 document.

After obtaining the FQDN of H-NRF 26, V-SEPP 22 performs N32-c handshake procedure with H-SEPP 28 in step 210. In step 212, V-SEPP 22 sends the NF Discover request to H2Proxy 32. In step 214, H2Proxy 32 sends the NF Discover request to H-SEPP 28. In step 216, H-SEPP 28 sends the NF Discover request to H-NRF 26. In step 218, H-NRF 26 sends a NF Discover response to H-SEPP 28. The NF Discover response comprises the FQDN of the H-NF 24. In step 220, H-SEPP 28 sends the NF Discover response to H2Proxy 32.

Next, in step 222, H2Proxy 32 mediates the NF Discover response received from HPLMN 14 by replacing the FQDN of H-NF 24 with the FQDN of IPX NF Proxy 30. In step 224, H2Proxy 32 sends the mediated NF Discover response to V-SEPP 22. In this manner, the NF Discover response received by VPLMN 12 contains the FQDN of IPX NF Proxy 32.

In step 226, V-SEPP 22 creates a telescopic FQDN comprising the FQDN of the IPX NF Proxy 30. In step 228, V-SEPP 22 sends the NF Discover response with the telescopic FQDN to V-NRF 20. Finally, in step 230, V-NRF 20 sends the NF Discover response to V-NF 18. At this point, V-NF 18 has the FQDN of IPX NF Proxy 30 and is able to send messages thereto.

Also, in steps 232-236, H2Proxy 32 sends the FQDN of H-NF 24 to IPX-Proxy 30. In an embodiment, these steps can be accomplished using an internal API.

Next, FIG. 9 depicts the Create PDU Session Procedure. In step 238, V-NF 18 sends a PDU Session Create request to V-SEPP 22. In step 240, V-SEPP 22 performs N32-c handshake procedure with IPX-SEPP 34. Then, in step 242, V-SEPP 22 sends the PDU Session Create request to H2Proxy 32. In step 244, H2Proxy sends the PDU Session Create request to IPX-SEPP 34. IPX-SEPP 34 converts the PDU Session Create request from N32-f format and, in step 246, sends the PDU Session Create request to IPX NF Proxy 30. Because IPX NF Proxy 30 has already obtained the FQDN of H-NF 24 in step 236, IPX NF Proxy 30 can send egress messages to H-NF 24, and no additional NF Discovery is needed.

Next, in step 248, IPX NF Proxy 30 sends out a PDU Session Create request via IPX-SEPP 34. IPX-SEPP 34 converts the PDU Session Create request to N32-f format and, in step 250, sends it to H2Proxy 32. In step 252, H2Proxy 32 sends the PDU Session Create request to H-SEPP 28, which converts it from the N32-f format and, in step 254, sends it to the H-NF 24, which is the target destination.

In step 256, H-NF 24 responds with the PDU Session Create response and sends it to H-SEPP 28. In step 258, H-SEPP 28 sends the N32-f PDU Session Create response to H2Proxy 32, which, in step 260, sends this message to IPX-SEPP 34. IPX-SEPP 34 converts the message from N32-f format and, in step 262, sends the PDU Session Create response to IPX NF Proxy 30. IPX NF Proxy 30 performs its proxy function and, in step 264, sends the PDU Session Create response toward VPLMN 12. IPX-SEPP 34 receives the PDU Session Create response from IPX NF Proxy 30 and converts the received message to N32-f format. In step 266, IPX-SEPP 34 sends this message to H2Proxy 32. In step 268, H2Proxy 32 sends the message to V-SEPP 22. Finally, in step 270, V-SEPP 22 sends the PDU Session Create response to V-NF 18. Subsequent messages between V-NF 18 and H-NF 24 are sent via IPX NF Proxy 30 following the same path. In this manner, IPX NF Proxy Platform 10 enables 5G roaming services between VPLMN 12 and HPLMN 14.

IPX NRF Proxy Approach

Figure 10:
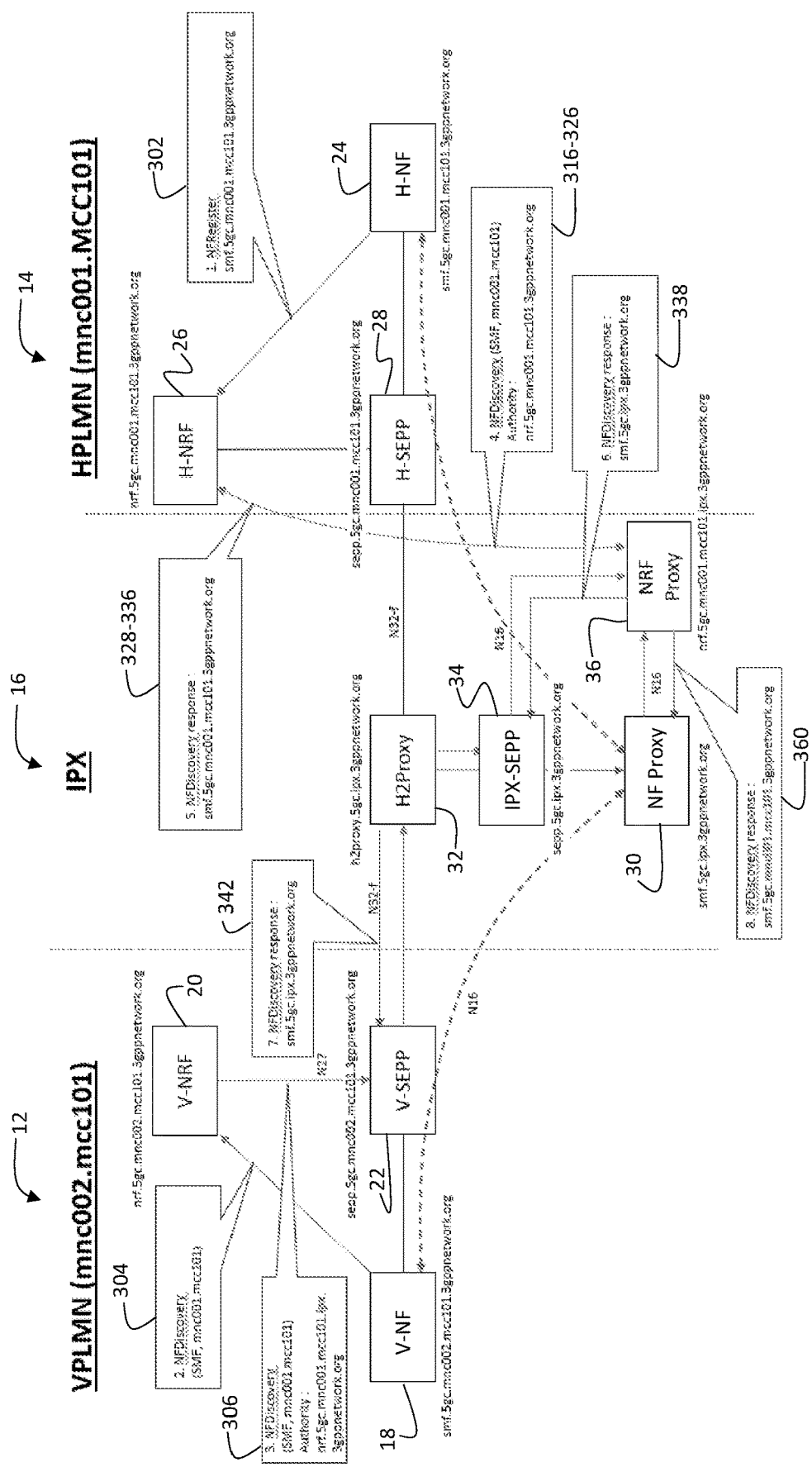
FIG. 10 is a block diagram schematically depicting the system architecture and message flow of NF Proxy Platform in one embodiment using 'NRF Proxy' approach.
Figure 11:
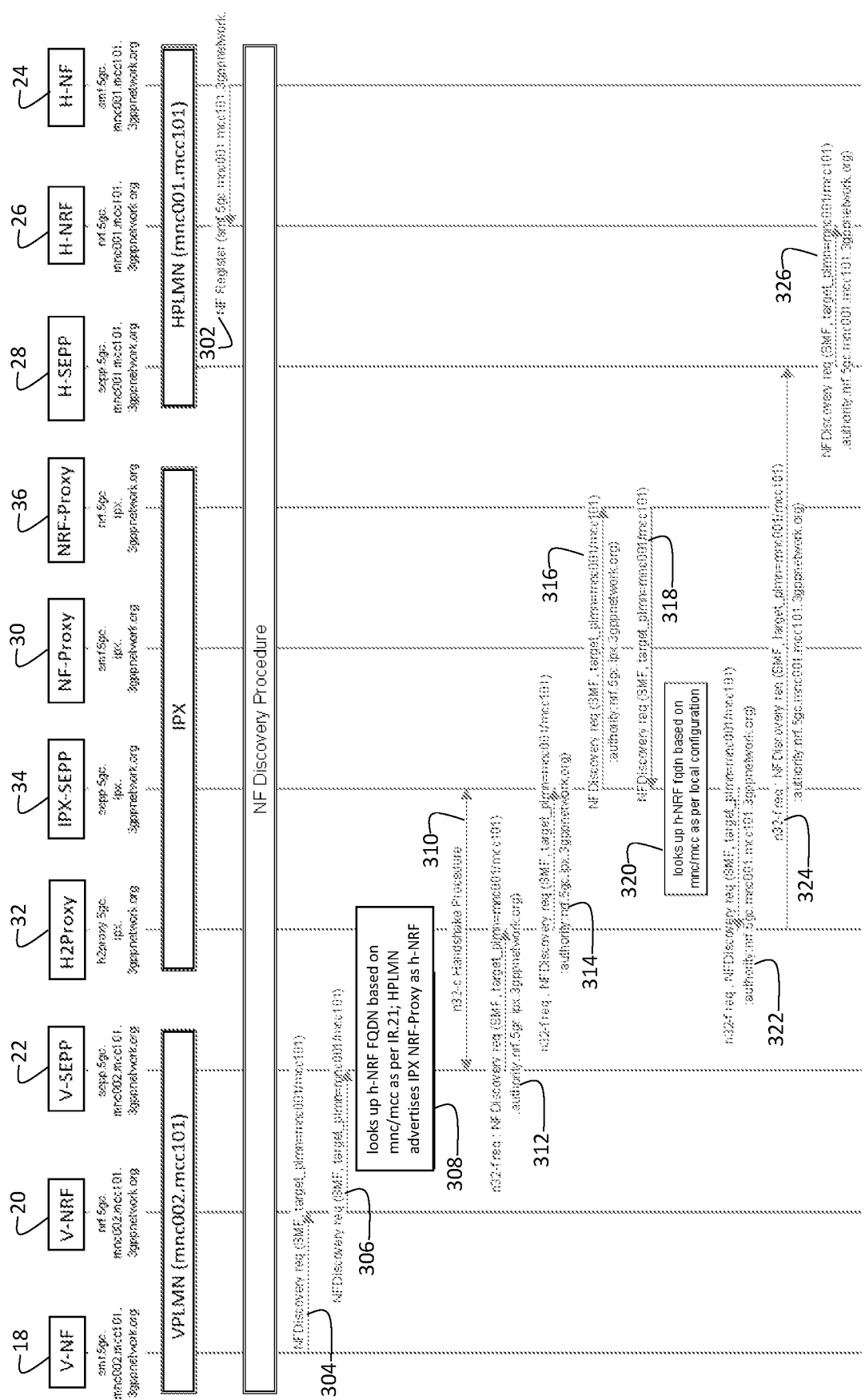
FIG. 11 is a sequence diagram schematically depicting the callflow of NF Proxy implementation using 'NRF Proxy' approach.
Figure 11:
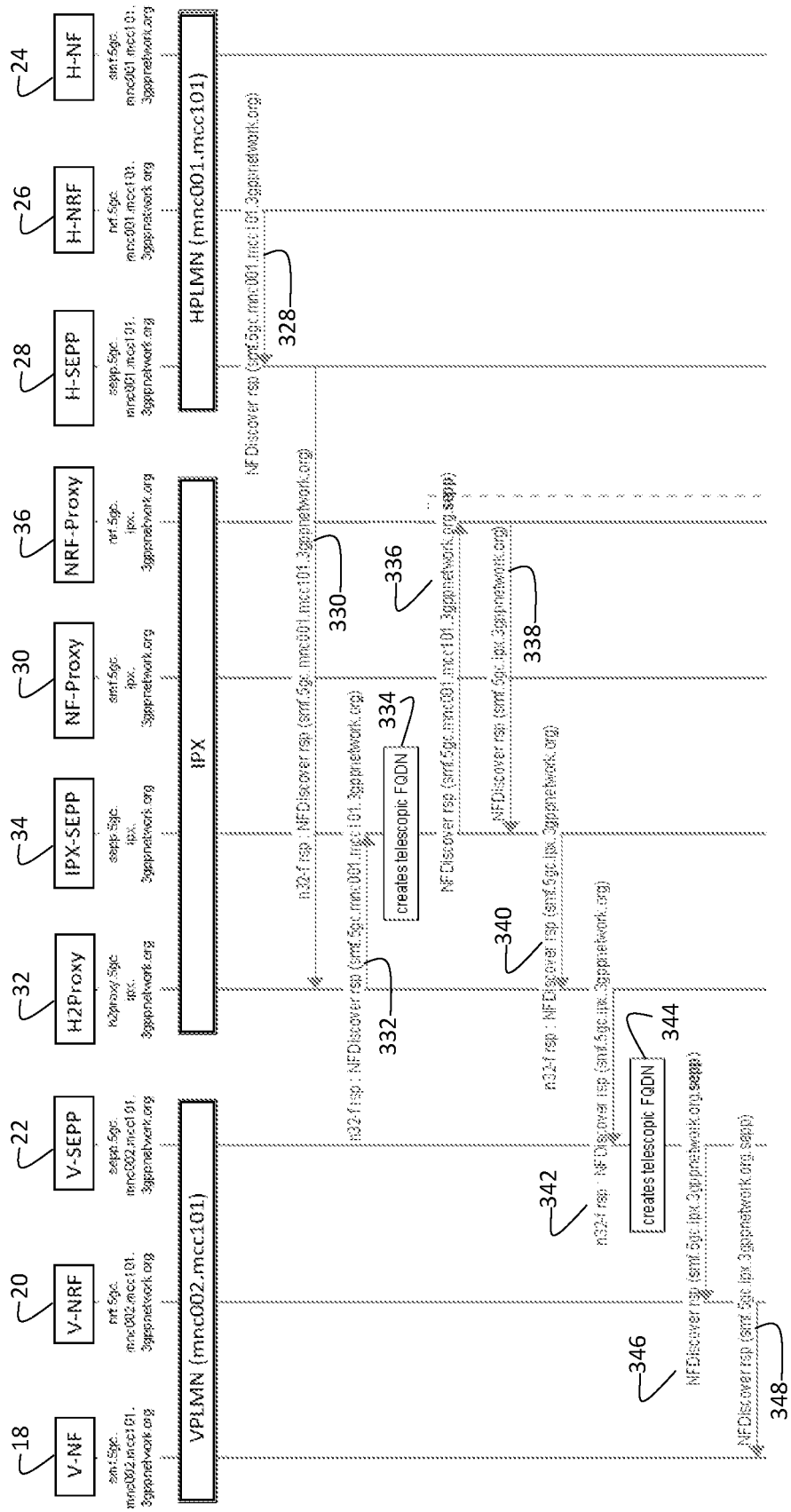
Figure 11:
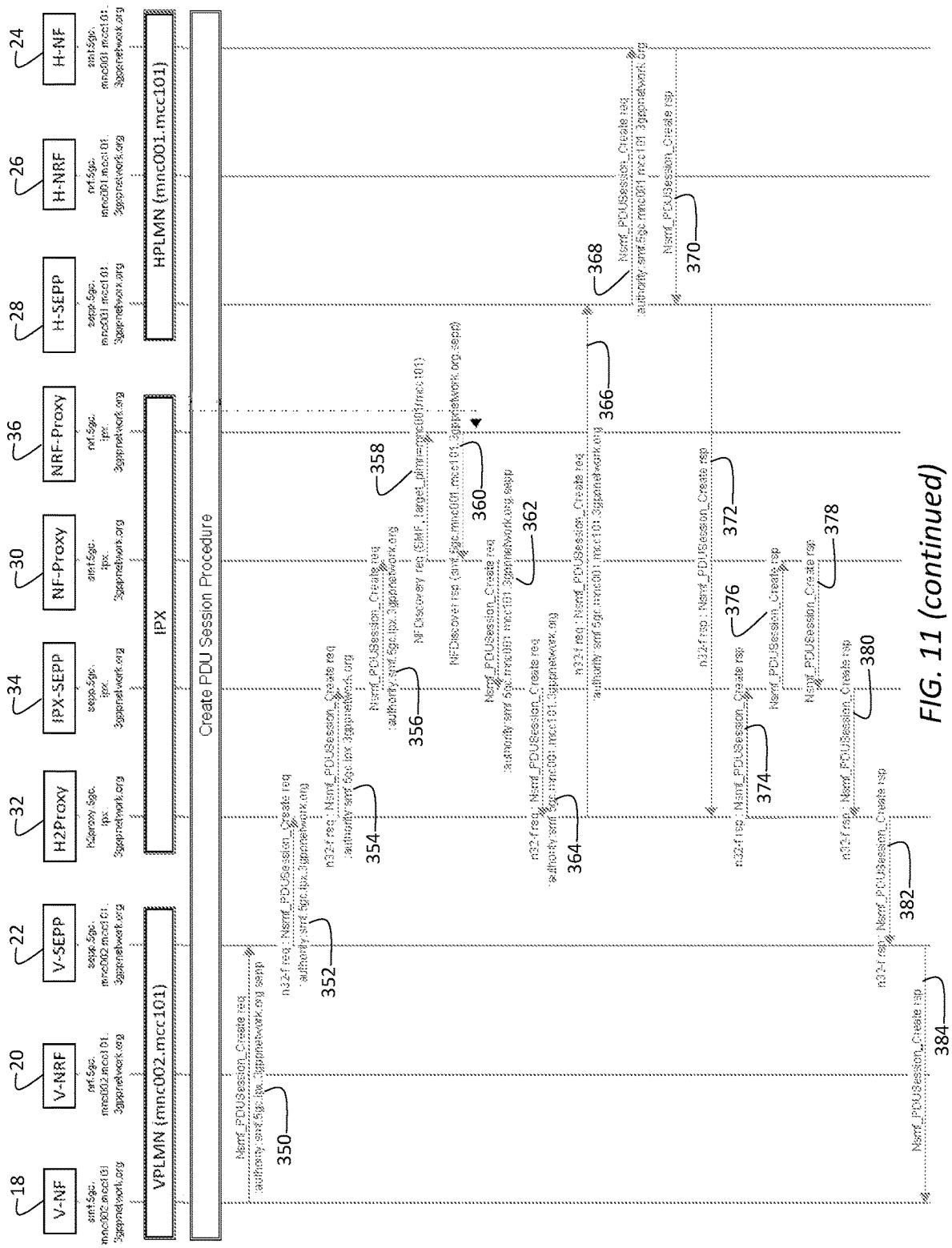

The embodiment depicted in FIGS. 10 and 11 implements the 'IPX NRF Proxy' approach. In this embodiment, the routing to IPX NF Proxy 30 (SMF Proxy in this example) is achieved as follows: HPLMN 14 advertises the FQDN of IPX NRF Proxy 36 in GSMA IR.21 document as the FQDN of its own H-NRF 26.

FIG. 10 depicts that, when an active H-NF 24 (H-SMF is used in this example) starts up in HPLMN 14, that active H-NF 24 registers its FQDN at H-NRF 26 in step 302. Subsequently, V-NF 18 (V-SMF in this example) queries the FQDN of H-NF 24 to which it intends to connect. To accomplish this, H-NF 24 sends a NF Discover query towards V-NRF 20 in step 304. In step 306, V-NRF 20 proxies the request through V-SEPP, the IPX HTTP/2 Proxy 32, and the IPX-SEPP 34 to reach IPX NRF Proxy 36. The NF Discover request is sent to IPX NRF Proxy 36 because this is the FQDN that HPLMN 14 advertises in its IR.21. Next, in steps 316-326, IPX NRF Proxy 36 sends another NF Discover request to H-NRF 26 to query the FQDN of the H-NF 24 (true target NF). In step 328, H-NRF 26 sends a NF Discover response having the FQDN of H-NF 24 to IPX NRF Proxy 36.

In step 338, the IPX NRF Proxy returns the FQDN of IPX NF Proxy 30. In step 342, H2Proxy 32 sends the NF Discover response having the FQDN of IPX NF Proxy 30 to VPLMN 12.

In step 360, IPX NRF Proxy 36 sends the FQDN of H-NF 24 to IPX NF Proxy 30 through an internal API.

Subsequently, when the V-NF 18 sends out an application message, the application message reaches IPX NF Proxy 30, which has already obtained the FQDN of H-NF 24 (target NF) from the internal API from IPX NRF Proxy 36. Next, IPX NF Proxy 30 performs its proxy function and routes the egress message to the H-NF 24 in HPLMN 14. In this manner, NF Proxy Platform 10 enables V-NF 18 and H-NF 24 to communicate with one another via IPX NF Proxy 30 within the IPX network.

FIG. 11 depicts the steps of this embodiment in more detail. In step 302, H-NF 24 registers its FQDN with H-NRF 26. Subsequently, in step 304, V-SMF 18 sends to V-NRF 20 a NF Discover request for FQDN of H-NF 24. In step 306, V-NRF 20 sends this NF Discover request to V-SEPP 22. In step 308, V-SEPP 22 looks up the FQDN that HPLMN 14 provided in the GSMA IR.21 document. In this embodiment, HPLMN 14 provides the FQDN of IPX NRF Proxy 36, rather than that of its own H-NRF 26.

After obtaining the FQDN of IPX NRF Proxy 30, V-SEPP 22 performs N32-c handshake procedure with IPX-SEPP 34 in step 310. In step 312, V-SEPP 22 sends the NF Discover request to H2Proxy 32. In step 314, H2Proxy 32 sends the NF Discover request to IPX-SEPP 28. In step 316, IPX-SEPP 34 sends the NF Discover request to IPX NRF Proxy 36. In step 318, IPX NRF Proxy 36 sends a NF Discover request to IPX-SEPP 34. In step 320, IPX-SEPP 34 looks up the FQDN of H-NRF 26 as per local configuration. Next, in steps 322-326, IPX-SEPP 34 sends the NF Discover request toward the FQDN of H-NRF 26 via H2Proxy 32 and H-SEPP 28.

Next, in step 328, H-NRF 26 responds with a NF Discover response having the FQDN of H-NF 24. In step 330, H-SEPP 28 sends the NF Discover response to H2Proxy 32. In step 332, H2Proxy 32 sends the NF Discover response to IPX-SEPP 34. In step 334, IPX-SEPP 34 creates a telescopic FQDN based on the FQDN of H-NF 24 and, in step 336, sends the NF Discover response to IPX NRF Proxy 36.

In step 338, IPX NRF Proxy 36 mediates the NF Discover response by replacing the FQDN of H-NF 24 with the FQDN of IPX NF Proxy 30 and sends the mediated NF Discover response to IPX-SEPP 34. In step 340, IPX-SEPP 34 converts the NF Discover response to N32-f format and sends it to H2Proxy 32. In step 342, H2Proxy 32 sends this NF Discover response to VPLMN 12, specifically, V-SEPP 22. In steps 344-348, VPLMN 12 delivers the NF Discover response having the FQDN of IPX NF Proxy 30 to V-NF 18. At this point, V-NF 18 becomes configured to send subsequent application messages to the FQDN of IPX NF Proxy 30.

Next, FIG. 11 depicts the Create PDU Session Procedure. In step 350, V-NF 18 sends a PDU Session Create request to V-SEPP 22. In step 352, V-SEPP 22 sends the PDU Session Create request to H2Proxy 32. In step 354, H2Proxy 32 sends the PDU Session Create request to IPX-SEPP 34. IPX-SEPP 34 converts the PDU Session Create request from N32-f format and, in step 356, sends the PDU Session Create request to IPX NF Proxy 30.

In step 358, IPX NF Proxy 30 queries IPX NRF Proxy 36 for the FQDN of H-NF 24. In step 360, IPX NRF Proxy 36 responds to IPX NF Proxy with a NF Discover response having the FQDN of H-NF 24. At this point, V-NF 18 has the FQDN of IPX NF Proxy 30, and IPX NF Proxy 30 has the FQDN of H-NF 24. Accordingly, IPX NF Proxy 30 can proxy application messages between V-NF 18 and H-NF 24.

Next, in step 362, IPX NF Proxy 30 sends out a PDU Session Create request via IPX-SEPP 34. IPX-SEPP 34 converts the PDU Session Create request to N32-f format and, in step 364, sends it to H2Proxy 32. In step 366, H2Proxy 32 sends the PDU Session Create request to H-SEPP 28, which converts it from the N32-f format and, in step 368, sends it to the H-NF 24, which is the target destination. In step 370, H-NF 24 responds with the PDU Session Create response and sends it to H-SEPP 28. In step 372, H-SEPP 28 sends the N32-f PDU Session Create response to H2Proxy 32, which, in step 374, sends this message to IPX-SEPP 34. IPX-SEPP 34 converts the message from N32-f format and, in step 376, sends the PDU Session Create response to IPX NF Proxy 30.

IPX NF Proxy 30 performs its proxy function and, in step 378, sends the PDU Session Create response toward VPLMN 12. IPX-SEPP 34 receives the PDU Session Create response from IPX NF Proxy 30 and converts the received message to N32-f format. In step 380, IPX-SEPP 34 sends this message to H2Proxy 32. In step 382, H2Proxy 32 sends the message to V-SEPP 22. Finally, in step 384, V-SEPP 22 sends the PDU Session Create response to V-NF 18. Subsequent messages between V-NF 18 and H-NF 24 are sent via IPX NF Proxy 30 following the same path. In this manner, IPX NF Proxy Platform 10 enables 5G roaming services between VPLMN 12 and HPLMN 14.

Hardware and Software Infrastructure Examples

The present invention may be embodied on various platforms. The following provides an antecedent basis for the information technology that may be utilized to enable the invention.

Embodiments of the present invention may be implemented in hardware, firmware, software, or any combination thereof. Embodiments of the present invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The machine-readable medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device. Storage and services may be on premise or remote such as in the "cloud" through vendors operating under the brands, MICROSOFT AZURE, AMAZON WEB SERVICSE, RACKSPACE, and KAMATERA.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a computer readable storage medium and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk or the like.

Hardware equipment may be agnostic as to general computing or may be telecommunications-specific. Some equipment providers include those under the brands HUAWEI, CISCO SYSTEMS, NOKIA, and QUALCOMM.

Program code embodied on a machine-readable medium may be transmitted using any appropriate medium, including but not limited to wireless, wire-line, optical fiber cable, radio frequency, etc., or any suitable combination of the foregoing. Machine-readable program code for carrying out operations for aspects of the present invention may be written in any combination of one or more programming languages, including an object-oriented programming language such as Java, C#, C++, Visual Basic or the like and conventional procedural programming languages, such as the "C" programming language or similar programming languages. Additional languages like ERLANG (or Open Telecom Platform, OTP) may be used or scripting languages such as PYTHON, LUA and PERL.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by machine-readable program instructions.

The advantages set forth above, and those made apparent from the foregoing disclosure, are efficiently attained. Since certain changes may be made in the above construction without departing from the scope of the invention, it is intended that all matters contained in the foregoing disclosure or shown in the accompanying drawings shall be interpreted as illustrative and not in a limiting sense.

What is claimed is:

1. A method of enabling a Visiting Public Land Mobile Network (VPLMN) to provide a 5G roaming service to a User Equipment (UE) subscribed to a Home Public Land Mobile Network (HPLMN), wherein the VPLMN and the HPLMN are 5G networks connected via an Internet Protocol Exchange (IPX) network, the method comprising:

provisioning a Network Function (NF) Proxy Platform hosted on the IPX network, the NF Proxy Platform comprising a NF Proxy configured to proxy application messages between the VPLMN and the HPLMN and a Security Edge Protection (SEPP) configured to convert the application messages to or from a N32-f format;

receiving, by the NF Proxy Platform, a first NF discovery request from the VPLMN;

sending, by the NF Proxy Platform, a second NF discovery request to the HPLMN;

sending, by the NF Proxy Platform, a first NF discovery response to the VPLMN, the first NF discovery response comprising a domain name of the NF Proxy, receiving, by the NF Proxy Platform, a second NF discovery response from the HPLMN, the second NF discovery response comprising a domain name of a HPLMN NF (H-NF), wherein the domain name of the H-NF is conveyed to the NF Proxy;

receiving, by the NF Proxy, a first application message from the VPLMN;

performing, by the NF Proxy, a proxy function with respect to the first application message thereby producing an egress message; and sending, by the NF Proxy, the egress message to the H-NF.

2. The method of claim 1, wherein the NF Proxy Platform comprises a Hypertext Transport Protocol Proxy (HTTP Proxy).

3. The method of claim 2, wherein the HTTP Proxy is in communication with a VPLMN Security Edge Protection Proxy (V-SEPP) and a HPLMN SEPP (H-SEPP).

4. The method of claim 3, wherein the first NF discovery request is received by the HTTP Proxy from the V-SEPP.

5. The method of claim 3, wherein the second NF discovery request is sent by the HTTP Proxy to the H-SEPP.

6. The method of claim 3, wherein the second NF discovery response is received by the HTTP Proxy from the H-SEPP.

7. The method of claim 1, wherein the HPLMN is configured to respond to the first NF discovery request from the VPLMN with the domain name of the NF Proxy and wherein the HPLMN is configured to respond to the second NF discovery request from the NF Proxy Platform with the domain name of the H-NF.

8. The method of claim 7, wherein the second NF discovery request comprises a predefined parameter indicating to the HPLMN that the second NF discovery request is from the IPX network.

9. The method of claim 2, wherein, the HTTP Proxy receives the domain name of the H-NF from the HPLMN and sends the domain name of the NF Proxy to the VPLMN.

10. The method of claim 1, wherein the domain name of the H-NF is conveyed to the NF Proxy via an Application Programming Interface (API) internal to the NF Proxy Platform.

11. The method of claim 1, wherein the NF Proxy Platform is configured to receive the domain name of the H-NRF from a HPLMN Network Repository Function (H-NRF).

12. The method of claim 11, wherein the NF Proxy Platform comprises a NRF proxy configured to communicate with the H-NRF.

13. The method of claim 12, wherein the HPLMN is configured to provide a domain name of the NRF proxy in a predefined Global System for Mobile Communications Association (GSMA) document whereby the domain name of the NRF proxy can be obtained by the VPLMN.

14. The method of claim 11, wherein the NRF proxy is configured to send the domain name of the H-NF to the NF Proxy through an API internal to the NF Proxy Platform.

15. The method of claim 2, wherein the HTTP Proxy is a HTTP/2 Proxy configured to proxy or mediate N32-f messages between the VPLMN and the HPLMN.

16. The system of claim 2, wherein the HTTP Proxy is a HTTP/2 Proxy configured to proxy or mediate N32-f messages between the VPLMN and the HPLMN.

17. A Network Function (NF) Proxy Platform for enabling a Visiting Public Land Mobile Network (VPLMN) to provide a 5G roaming service to a User Equipment (UE) subscribed to a Home Public Land Mobile Network (HPLMN), wherein the VPLMN and the HPLMN are 5G networks connected via an Internet Protocol Exchange (IPX) network, comprising:

a Network Function (NF) Proxy hosted in the IPX network, the NF Proxy configured to proxy application messages between the VPLMN and the HPLMN;

a Hypertext Transport Protocol (HTTP) Proxy hosted in the IPX network in communication with the HPLMN and the VPLMN, wherein the HTTP Proxy is configured to receive a first NF discovery request from the VPLMN, responding thereto with a domain name of the NF Proxy; and a Security Edge Protection (SEPP) in communication with the HTTP Proxy and the NF Proxy, wherein the SEPP is configured to convert the application messages to and from N32-f format;

wherein the NF Proxy Platform is configured to send a second NF discovery request to the HPLMN to obtain a domain name of a HPLMN NF (H-NF), and wherein the NF Proxy is configured to perform a proxy function with respect to the application messages and configured to send egress messages to the domain name of the H-NF.

18. The system of claim 17, wherein the HTTP Proxy is in communication with a VPLMN SEPP (V-SEPP) and a HPLMN SEPP (H-SEPP).

19. The system of claim 18, wherein the first NF discovery request is received by the HTTP Proxy from the V-SEPP.

20. The system of claim 18, wherein the second NF discovery request is sent by the HTTP Proxy to the H-SEPP.

21. The system of claim 19, wherein a second NF discovery response comprising the domain name of the H-NF is received by the HTTP Proxy from the H-SEPP.

22. The system of claim 17, wherein the HPLMN is configured to respond to the first NF discovery request from the VPLMN with the domain name of the NF Proxy and wherein the HPLMN is configured to respond to the second NF discovery request from the NF Proxy Platform with the domain name of the H-NF.

23. The system of claim 17, wherein the second NF discovery request comprises a predefined parameter indicating to the HPLMN that the second NF discovery request is from the IPX network.

24. The system of claim 17, wherein the NF Proxy obtains the domain name of the H-NF via an Application Programming Interface (API) internal to the NF Proxy Platform.

25. The system of claim 17, wherein the NF Proxy Platform is configured to receive the domain name of the H-NRF from a HPLMN Network Repository Function (H-NRF).

26. The system of claim 25, wherein the NF Proxy Platform comprises a NRF proxy configured to communicate with the H-NRF.

27. The system of claim 26, wherein the NRF proxy is configured to send the domain name of the H-NF to the NF Proxy through an API internal to the NF Proxy Platform.

28. The system of claim 26, wherein the HPLMN is configured to provide a domain name of the NRF proxy in a predefined Global System for Mobile Communications Association (GSMA) document whereby the domain name of the NRF proxy can be obtained by the VPLMN.

* * * * *